(12) United States Patent
Burstrom et al.

(10) Patent No.: US 8,437,704 B2
(45) Date of Patent: May 7, 2013

(54) SYSTEM AND METHOD FOR RESUMING POWER CONTROL AFTER INTERRUPTION

(75) Inventors: Per Burstrom, Lulea (SE); Anders Furuskar, Stockholm (SE); Muhammad Kazmi, Bromma (SE); Walter Muller, Upplands Vasby (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 12/863,105

(22) PCT Filed: Jan. 17, 2008

(86) PCT No.: PCT/SE2008/050055
§ 371 (c)(1),
(2), (4) Date: Jul. 15, 2010

(87) PCT Pub. No.: WO2009/091304
PCT Pub. Date: Jul. 23, 2009

(65) Prior Publication Data
US 2011/0117952 A1    May 19, 2011

(51) Int. Cl.
*H04B 7/00* (2006.01)
(52) U.S. Cl.
USPC .................................... 455/69; 455/463
(58) Field of Classification Search ............ 455/69, 455/522, 463, 526
See application file for complete search history.

(56) References Cited

U.S. PATENT DOCUMENTS

| | | |
|---|---|---|
| 2003/0003875 A1 | 1/2003 | Oestreich |
| 2004/0087328 A1* | 5/2004 | Ronkainen ............... 455/522 |
| 2005/0020296 A1* | 1/2005 | Baker et al. ............. 455/522 |
| 2007/0265757 A1 | 11/2007 | Kawasaki |
| 2007/0286155 A1 | 12/2007 | Kaikkonen et al. |

FOREIGN PATENT DOCUMENTS
WO    01/56187 A2    8/2001

* cited by examiner

*Primary Examiner* — Tu X Nguyen
(74) *Attorney, Agent, or Firm* — Coats & Bennett, P.L.L.C.

(57) ABSTRACT

System and method for controlling the transmit power of a mobile terminal. In some embodiments, a transmit power correction factor for a mobile terminal is set to the average transmit power correction factor for all active mobile terminals in the same cell as the mobile terminal.

44 Claims, 5 Drawing Sheets

SYSTEM AND METHOD FOR RESUMING POWER CONTROL AFTER INTERRUPTION

TECHNICAL FIELD

The present invention relates generally to telecommunication systems. Embodiments of the present invention relate to controlling the transmit power of mobile terminals.

BACKGROUND

In a wireless communication system that includes a base station (e.g., an evolved Node B) and a plurality of mobile terminals (e.g., a plurality of mobile phones or other mobile devices capable of wireless communication with the base station), the base station may be configured to control the transmit power of the mobile terminals. For example, the base station may employ a method to limit the transmit power of one or more of the mobile terminals for the purpose of improving an overall signal to interference and noise ratio (SINR) for the cell served by the base station. As an example, the base station may employ a closed loop power control scheme to improve the SINR. In a closed loop power control scheme, the base station determines the SINR in the cell and then transmits individual transmit power control (TPC) messages to the mobile stations based on the determined SINR. Each TPC message transmitted to a mobile terminal includes data (e.g., a value) that is used by the mobile terminal in setting its transmit power. Such data may be referred to as a TPC command. In some systems (e.g., in long term evolution (LTE) communication systems) the SINR determination is done continuously for every new radio frame. A combination of open loop and closed loop power control may be used in LTE, and closed loop around an open loop. For example, a mobile terminal may set an open loop power based on measurements on reference signals from the base station, and the TPC commands sent from the base station define an adjustment to the open loop power (i.e., an amount by which the mobile terminal should increase or decrease the power).

For a mobile terminal that has not transmitted data to the base station within some predetermined period of time (e.g., a mobile terminal that has been inactive for some time), the base station will not have an up-to-date measurement of the mobile terminal's signal quality. Accordingly, when such an inactive mobile terminal subsequently has data to transmit to the base station, the base station will not have a good way to determine the value at which to set the mobile terminal's transmit power (e.g., the TPC command) for the mobile terminal's initial transmissions. This may lead to the mobile terminal either (1) transmitting its data using more transmit power than necessary, thereby causing excessive interference to the cell or (2) transmitting its data using insufficient output power, thereby increasing the likelihood that a re-transmission will be needed.

The amount of time it takes for a base station to measure a mobile terminal's signal quality is on the order or 2-10 ms. Because the radio bitrate can be very high (e.g., up to 85 Mbps in an LTE uplink), the transmission time is in many cases very short, thus the amount of data transmitted by the mobile terminal during this 2-10 ms period may be a significant fraction of the mobile terminal's transmissions.

In LTE systems, there is a possibility to control the power of a mobile terminal when it is not active with TPC-physical downlink control channel (TPC-PDCCH), but there is no channel on which to measure signal quality. Uplink sounding can be turned on, but this is a very costly alternative for maintaining power control for inactive mobile terminals.

SUMMARY

It is an object to provide improved systems and methods for controlling the transmit power of mobile terminals.

In one aspect, the invention provides a base station configured to control the transmit power of a mobile terminal for which the base station does not have an up-to-date measurement of the mobile terminal's signal quality. In some embodiments, the base station includes: transmit power control (TPC) means for calculating a TPC command using TPC commands that were previously transmitted to a set of two or more other mobile terminals; and transmitting means for transmitting to the mobile terminal the TPC command calculated by the TPC means.

The mobile terminal may be configured to use the TPC command in setting the power at which the mobile terminal transmits to the base station uplink data, which may include an uplink control response (e.g., an ACK/NACK). The transmitting means may be configured to transmit the TPC command along with downlink data to the mobile terminal. The base station may further include receiving means for receiving a request from the mobile terminal, and the transmitting means may be configured to transmit to the mobile the TPC command in response to the receiving means receiving the request (e.g., the transmitting means may be configured to transmit the TPC command along with an uplink scheduling command to the mobile terminal).

The TPC means may be configured to calculate the TPC command by determining the average or the $x^{th}$ percentile (e.g. median or $90^{th}$ percentile) of the TPC commands that were previously transmitted to the set of other mobile terminals (e.g., transmitted since the last time the base station measured the signal quality of the mobile terminal). The set of other mobile terminals may consist of (a) all the active mobile terminals in communication with the base station or (b) a subset of all the active mobile terminals in communication with the base station. The base station may further include scheduling means for scheduling the mobile terminal in the downlink, means for determining whether there is an up-to-date measurement of the mobile terminal's signal quality in response to the scheduling means scheduling the mobile terminal in the downlink, means for measuring the mobile terminal's signal quality, processing means for calculating a second TPC command based, at least in part, on the measured signal quality, and means for transmitting the second TPC command to the mobile terminal.

In another aspect, the invention provides a communication system that comprises a base station and a mobile terminal, where the base station is configured to control the transmit power of the mobile terminal. In some embodiments, the base station is configured to (a) calculate a TPC command using TPC commands that were previously transmitted to a set of two or more other mobile terminals and (b) transmit to the mobile terminal the calculated TPC command in response to an event if the base station does not have an up-to-date measurement of the mobile terminal's signal quality. The base station may be configured to transmit the TPC command along with downlink data to the mobile terminal. Similarly, the base station may be configured to transmit the TPC command along with an uplink scheduling command to the mobile terminal. The event may be the scheduling of a downlink transmission for the mobile terminal or the receipt of a request from the mobile terminal. The mobile terminal may be configured to receive the TPC command from the base station and then transmit data (e.g., an uplink control response, such as an acknowledgment) to the base station using a power level based, at least in part, on the received TPC command.

In another aspect, the invention provides a method for controlling a mobile terminal's transmit power. In some embodiments, the method includes: (a) determining a transmit power control (TPC) command, wherein the TPC command is a function of TPC commands that were previously transmitted to a set of two or more other mobile terminals; (b) determining whether there is an up-to-date signal quality measurement for the mobile terminal; and (c) if there is not an up-to-date signal quality measurement for the mobile terminal, then transmitting to the mobile terminal the TPC command from step (a). The method may also include scheduling the mobile terminal in the downlink, wherein step (b) is performed in response to the scheduling of the mobile terminal in the downlink. In some embodiments, the TPC command is a power correction factor. For example, in some embodiments, the TPC command is a $\Delta_{PUCCH}$ value. Additionally, in some embodiments the method may further include the steps of: for each mobile terminal included in the set of mobile terminals, determining an accumulated TPC command value; calculating a value based, at least in part, on the accumulated TPC values, wherein step (a) comprises setting the TPC command to the calculated value or to a value included in a set of predetermined values that is closest to the calculated value. The step of determining an accumulated TPC command value for one of the mobile terminals included in the set of mobile terminals may include summing all of the TPC commands sent to the one of the mobile terminals since the last time the base station measured the signal quality of the mobile terminal. The step of calculating a value based, at least in part, on the accumulated TPC command values may include calculating the average or the $x^{th}$ percentile (e.g. median or $90^{th}$ percentile) of the accumulated TPC command values.

The above and other aspects and embodiments of the present invention are described below with reference to the accompanying drawings.

BRIEF DESCRIPTION OF DRAWINGS

The accompanying drawings, which are incorporated herein and form part of the specification, illustrate various embodiments of the present invention.

DETAILED DESCRIPTION

Figure 1:
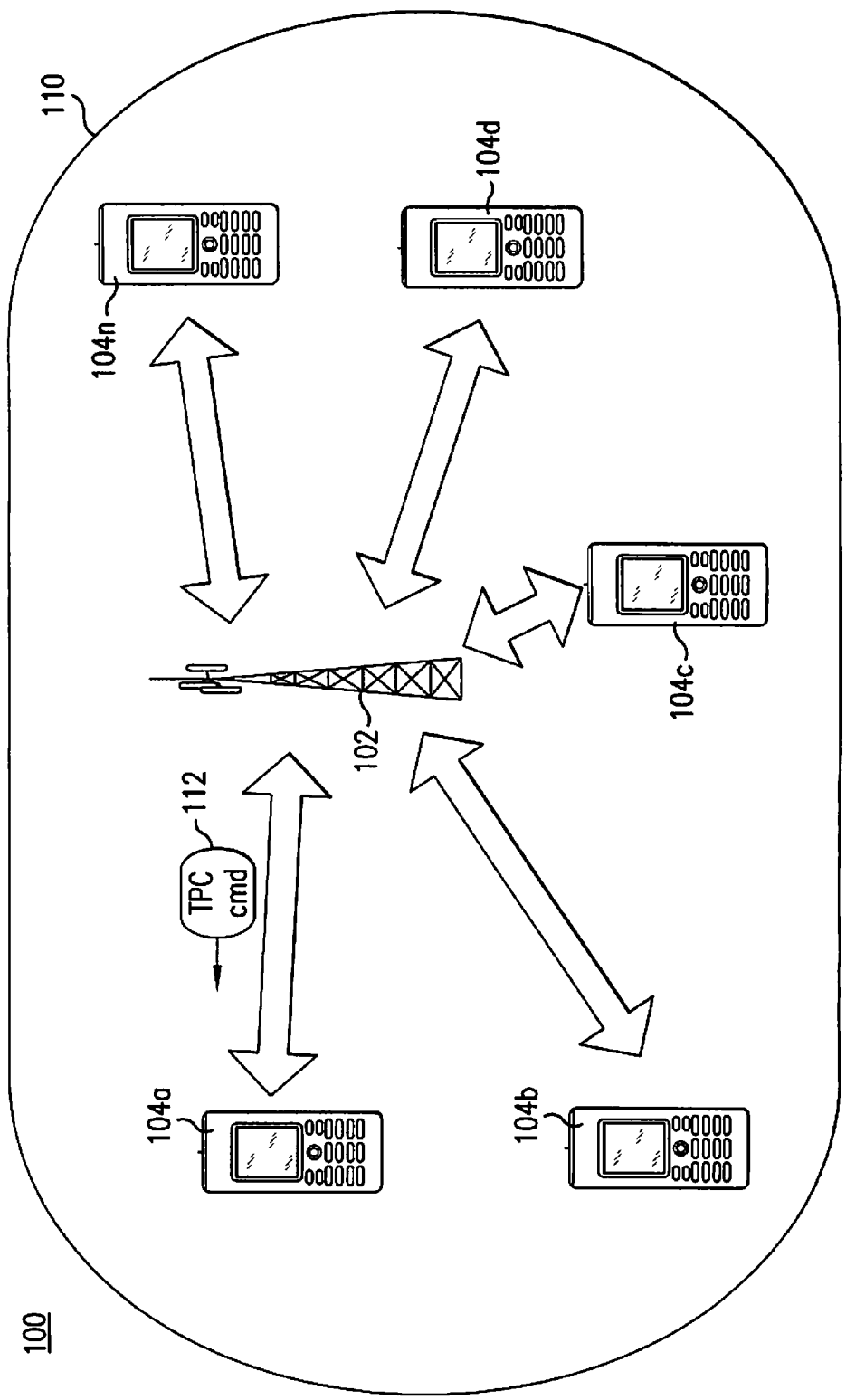
FIG. 1 illustrates a wireless communication system.

Referring now to FIG. 1, FIG. 1 illustrates a wireless communication system 100. As illustrated in FIG. 1, System 100 may include a base station 102 that serves a cell 110 and a set of mobile terminals 104a-104n in cell 110. To illustrate an embodiment of the invention, we shall assume that base station 102 has not yet had an opportunity to measure the quality of a signal transmitted from mobile terminal 104a or has not measured the quality of a signal transmitted from mobile terminal 104a for some period of time because, for example, mobile terminal 104a has been idle for a while.

In some embodiments, when mobile terminal 104a has data to transmit to base station 102, mobile terminal 104a may transmit to base station 102 a message indicating this fact (e.g., mobile terminal 104a may transmit to base station 102 a scheduling request (SR) message when mobile terminal 104a has data to transmit). In response to receiving the message, base station 102 may determine whether it has an up-to-date measurement of the mobile terminal's signal quality and transmit to mobile terminal 104a TPC command 112. In some embodiments of the invention, if the base station does not have an up-to-date measurement of the signal quality, the TPC command 112 may be a function of TPC commands previously sent to all of the active mobile terminals 104 within cell 110, or some subset thereof (the set of active mobile terminals in the cell may include, but is not limited to, mobile terminals that are actively transmitting data to base station 110 and/or may include the mobile terminals for which the base station has an up-to-date signal quality measurement). If the base station has an up-to-date measurement, then the TPC command 112 may be a function of the signal quality. The mobile terminal 104a uses the TPC command to adjust its transmit power (e.g., the mobile terminal may increase/decrease its power by an amount equal to the value of the TPC command).

In some embodiments, when base station 102 has data to transmit to mobile terminal 104a, base station 102 may determine whether it has an up-to-date measurement of the mobile terminal's signal quality, select a TPC command 112 to transmit to mobile terminal 104a based on a result of the determination, and then transmit to mobile terminal 104a the data and the TPC command 112. The TPC command may be sent along with the data. For example, if the base station does not have an up-to-date measurement of the mobile terminal's signal quality, then base station may select to send to mobile terminal 104a a TPC command that is a function of TPC commands sent to all of the active mobile terminals 104 within cell 110, or some subset thereof (the set of active mobile terminals in the cell may include, but is not limited to, mobile terminals that are actively transmitting data to base station 110 and/or may include the mobile terminals for which the base station has an up-to-date signal quality measurement). Otherwise, if the base station has an up-to-date measurement of the mobile terminal's signal quality, then base station may select to send to mobile terminal 104a a TPC command that is a function of the measured signal quality. As mentioned above, mobile terminal 104a uses the TPC command to adjust its transmit power.

In some embodiments, the TPC command 112 is equal to the mean of the TPC commands sent to the active mobile terminals 104 (or some subset thereof). For example, if the set of active terminals consists of mobile terminal 104b, 104c and 104d, and base station 102 sent to mobile terminal 104b a TPC command equal to 5, mobile terminal 104c a TPC command equal to 3, and mobile terminal 104d a TPC command equal to 10, then the TPC command 112 may be set to the mean of these values, which is 6. In other embodiments, the TPC command 112 is some other function of the TPC commands, for example the median or $x^{th}$ percentile.

Also, as mentioned above, the TPC command 112 may be a function of the TPC commands sent to a particular subset of the active mobile terminals 104. There are a variety of ways for base station 102 to determine the particular subset. For example, the determination may be based on radio conditions, quality of service, bit rate, etc., and any combination thereof. For example, if mobile terminal 104a is located at the cell edge and wants to upload an e-mail, the subset on which to base the TPC command 112 could be other like mobile terminals (e.g., other active mobile terminals located at the cell edge with low bandwidth requirements).

By sending to a new mobile terminal in the cell an initial TPC command that is a function of TPC commands sent previously to other active mobile terminals in the cell, there is high likelihood that the mobile terminal will use an output power for its initial transmissions that is closer to an optimal value than the output power the mobile terminal would have used for its initial transmission had it not received the initial TPC command.

Figure 2:
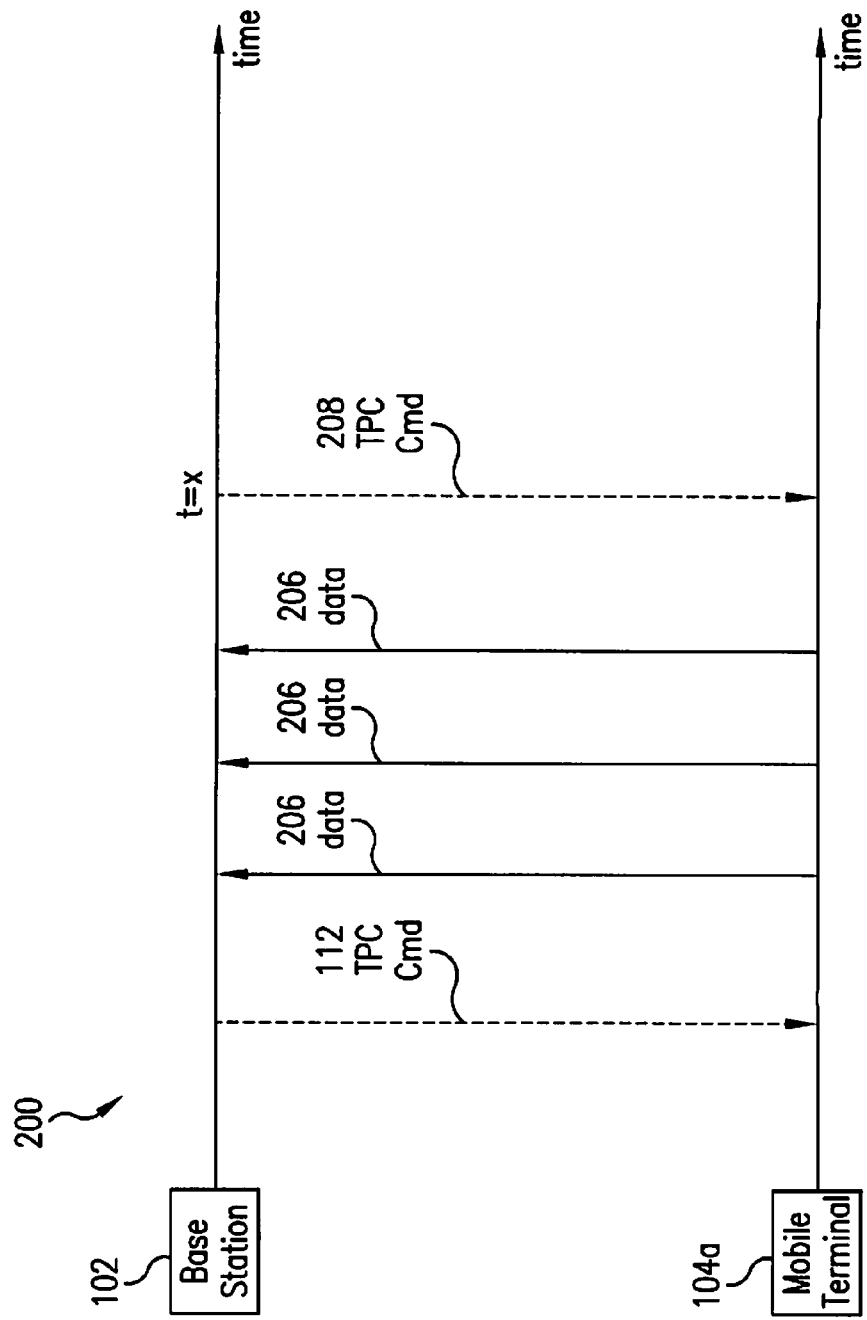
FIG. 2 illustrates an exemplary data flow according to some embodiments of the invention.
Figure 3:
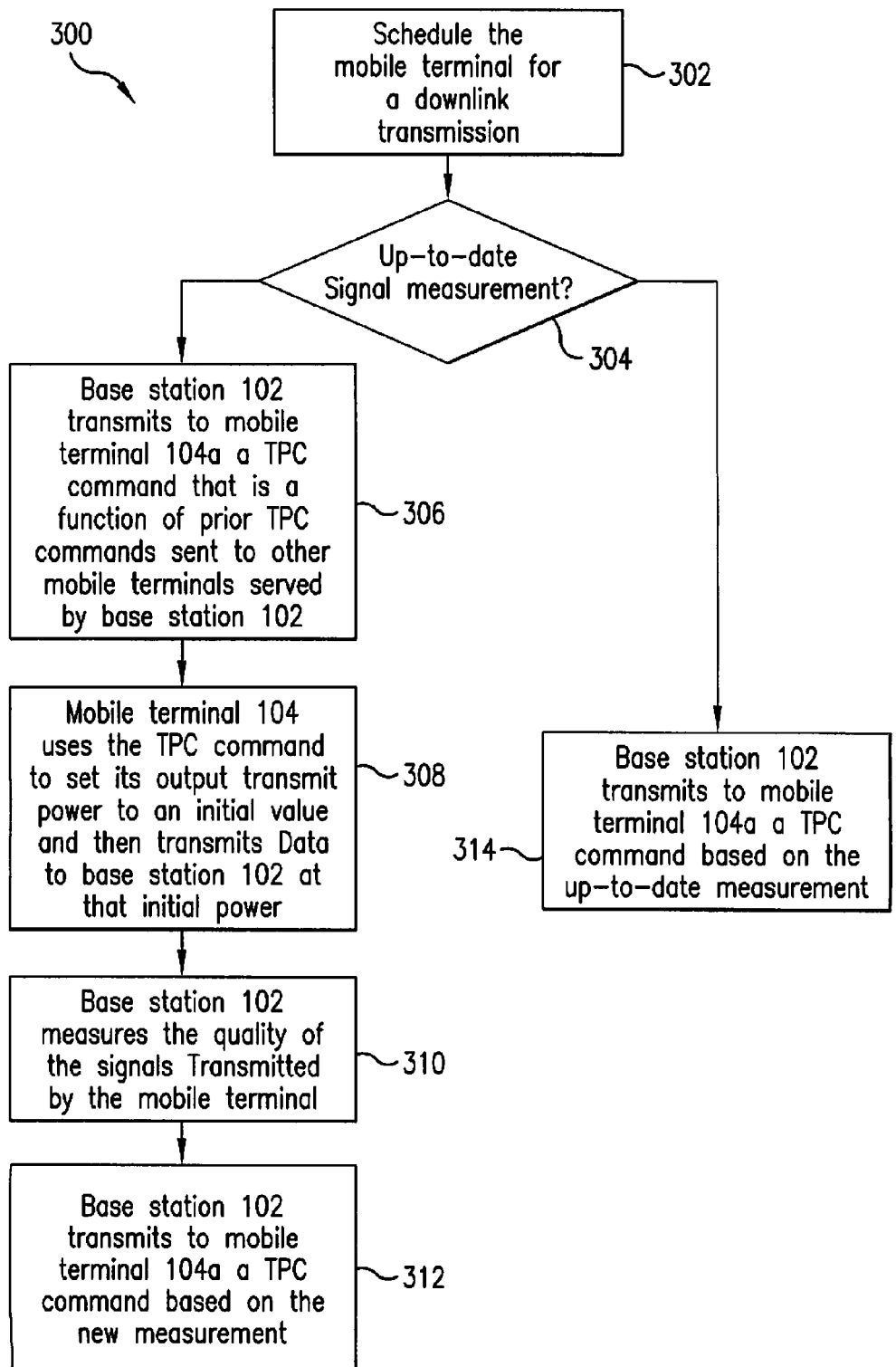
FIG. 3 is a flow chart illustrating a process according to some embodiments of the invention.

Referring now to FIGS. 2 and 3, FIG. 2 illustrates a data flow between a "new" mobile terminal (e.g., mobile terminal 104a) and base station 102 and FIG. 3 is a flow chart illustrating a process 300 according to some embodiments of the invention. The data flow 200 and process 300 further illustrate embodiments of the invention.

Process 300 may begin in step 302, where base station 102 acquires data for transmission to mobile terminal 104a and schedules a downlink transmission for the mobile terminal. Next, base station 102 determines whether it has an up-to-date measurement of the mobile terminal's signal quality (step 304). If so, process 300 may proceed to step 314, where base station 102 transmits to mobile terminal 104a a TPC command that is based, at least in part, on the up-to-date measurement, otherwise process 300 may proceed to step 306.

In step 306, base station 102 transmits to mobile terminal 104a a TPC command 112 that is a function of a set of prior TPC commands sent to other mobile terminals served by base station 102. In one embodiment, the set of prior TPC commands includes only the TPC commands sent to other mobiles since the last signal measurement was done for mobile terminal 104a. Mobile terminal 104 uses the TPC command 112 in setting its output transmit power to an initial value and then transmits to base station 102, at that initial power, data signals 206 (e.g., an ACK/NACK or other control signal) (step 308). At time t=x (which is usually about 2-10 milliseconds from when mobile terminal 104a transmitted its first signal 206 after receiving TPC command 112), base station 102 measures the quality of signals 206 (step 310). After base station 102 has measured the quality of the signals 206 transmitted from mobile terminal 104a, base station 102 may transmit a TPC command 208 to mobile terminal 104a, where TPC command 208 is based, at least in part, on the measured signal quality (step 312).

In third generation (3G) LTE communication systems, a mobile terminal (a.k.a., "user equipment (UE)") using the physical uplink control channel (PUCCH) regulates its power according to the following formula or a similar formula: $P_{PUCCH}(i)=P_0+PL+\Delta_{PUCCH}$ [dBm]. One skilled in the art will appreciate that the given formula is a somewhat simplified formula, sufficient in this context, where some terms (e.g. an offset based on what kind of modulation and coding scheme is used) have been left out.

Here, $P_0$ is a higher layer, slow correction factor, common for all mobile terminals in the cell; PL is a path loss compensation factor, and $\Delta_{PUCCH}$ is a correction factor sent on a frame-by-frame basis by the base station. The correction factor is relative resulting in an accumulated adjustment of the open loop power control. Accordingly, in embodiments of the invention, the $\Delta_{PUCCH}$ value (or other value, for example, $P_0$) is the TPC command. In some embodiments, the TPC command (e.g., $\Delta_{PUCCH}$) consists only of 2-bits, resulting in a configurable set of four adjustments (e.g., for example −1, 0, 1, 3 dB). As discussed above, for a new mobile terminal, the initial $\Delta_{PUCCH}$ sent to the new mobile terminal should be set as a function of all or a subset of other $\Delta_{PUCCH}$ in the cell instead of being zero, which is the default value the mobile terminal uses if no $\Delta_{PUCCH}$ is transmitted from the base station. Before used for this purpose, the $\Delta_{PUCCH}$ of other mobile terminals may be compensated for known mobile terminal specific offsets, such as measurement errors (these may in turn be available from power control for traffic channels).

Figure 4:
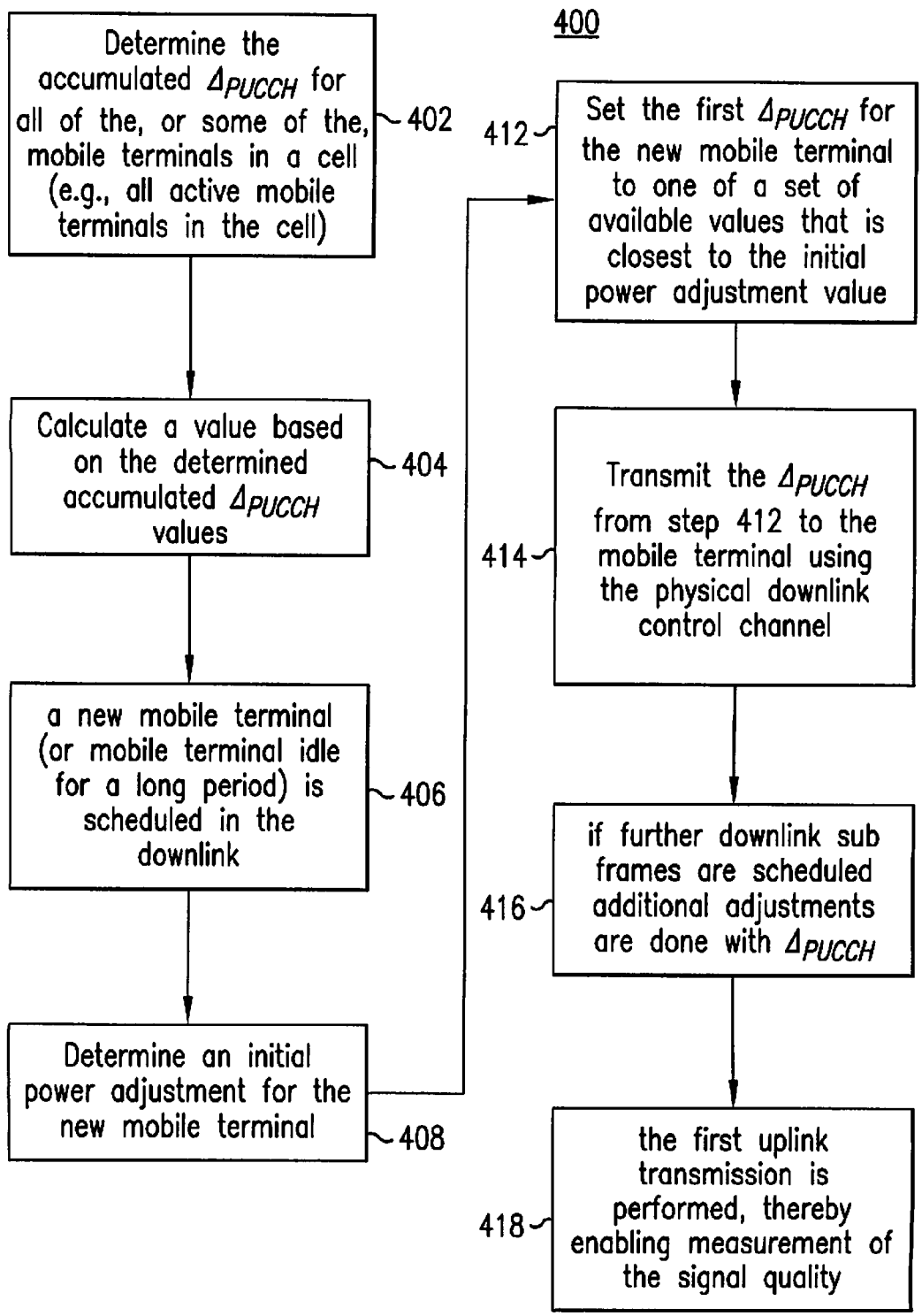
FIG. 4 is a flow chart illustrating a process according to some embodiments of the invention.

Referring now to FIG. 4, FIG. 4 is a flow chart illustrating a process 400 according to an embodiment of the invention. Process 400 may begin in step 402, where the accumulated $\Delta_{PUCCH}$ value for all or some of the mobile terminals in a cell (e.g., all active mobile terminals in the cell) is determined. Each determined accumulated $\Delta_{PUCCH}$ value may be compensated for known mobile terminal specific offsets, not relevant for other mobile terminals' power setting.

In step 404, a value is calculated based on the accumulated $\Delta_{PUCCH}$ values determined from step 402. For example, the average of the per terminal accumulated $\Delta_{PUCCH}$ for all active terminals is calculated. As a specific example, assume there are three active terminals in the cell and the first terminal received the following two $\Delta_{PUCCH}$ values (1 and 3), the second terminal received the following three $\Delta_{PUCCH}$ values (−1, 1 and 3), and the third terminal received the following two $\Delta_{PUCCH}$ values (0 and 2). In such an example, the accumulated $\Delta_{PUCCH}$ value for the first terminal is 4, the accumulated $\Delta_{PUCCH}$ value for the second terminal is 3, and the accumulated $\Delta_{PUCCH}$ value for the third terminal is 2. Hence the average of the per terminal accumulated $\Delta_{PUCCH}$ values is 3 (i.e., 9/3)

In step 406, a new mobile terminal (or mobile terminal idle for a long period) is scheduled in the downlink.

In step 408, an initial power adjustment for the new mobile terminal is determined. For example, the initial power adjustment may be set to the value calculated in step 404.

In step 412, the first $\Delta_{PUCCH}$ for the new mobile terminal is set to one of a set of available values that is closest to the initial power adjustment value from step 408. For example, if $\Delta_{PUCCH}$ consists only of 2-bits, then a $\Delta_{PUCCH}$ value can correspond to one of only 4 available values (e.g., values −1, 0, 1, or 3). Thus, for example, if the initial power adjustment value from step 408 is 4, then, in step 412, the first $\Delta_{PUCCH}$ for the new mobile terminal is set to correspond to the value of 3, which is the available value that is closest to 4.

In step 414, the $\Delta_{PUCCH}$ calculated in step 412 is sent to the mobile terminal using the physical downlink control channel.

In step 416, if further downlink sub frames are scheduled and the determined $\Delta_{PUCCH}$ from step 412 did not compensate for the full adjustment in step 408, then additional adjustments are done with one or more additional $\Delta_{PUCCH}$. Continuing with the above example where the available TPC steps are −1, 0, 1, and 3 dB and the initial power adjustment determined is 4 dB, then in this step a 1 dB TPC command is used summing up to 4 dB adjustment.

In step 418, the first uplink transmission is performed, thereby enabling measurement of the signal quality.

In some embodiments, prior to performing step 412, the initial power adjustment from step 408 can be further refined by taking the number of scheduled users per sub frame into account. The PUCCH is code divided and there is an orthogonality loss resulting in that the power needed is strongly dependent on the number of transmitting users on PUCCH per sub frame. For example, the average power per cell can be measured and collected separately for each amount of number of downlink FDMA scheduled users. This enables another degree of freedom when determining the TPC command, e.g. if one user arrives to a cell where the number of already active users is rapidly changed, this effect could be taken into account by the base station. Another example is when multiple users arrive simultaneously to the cell, as their combined impact on the interference and thereby cell average $\Delta_{PUCCH}$, is larger than if only one user arrives, all other things being equal.

Figure 5:
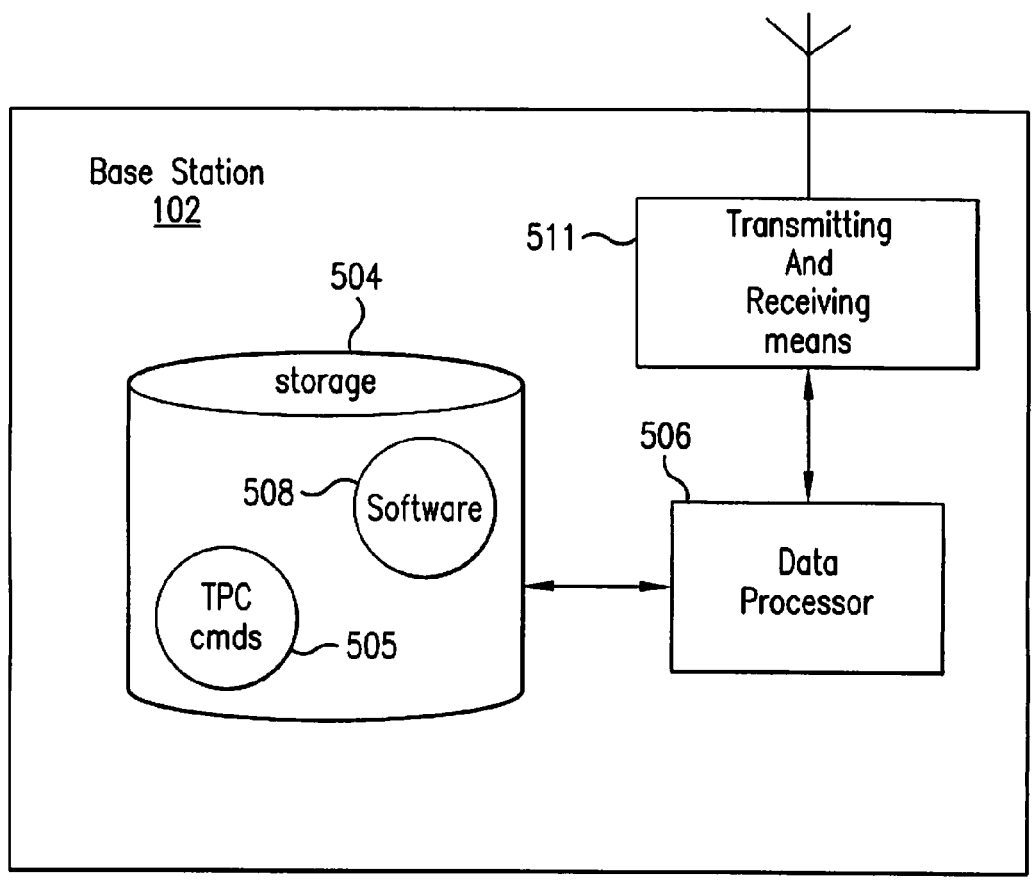
FIG. 5 is a functional block diagram of a base station according to some embodiments of the invention.

Referring now to FIG. 5, FIG. 5 is functional block diagram of base station 102 according to an embodiment of the invention. As shown in FIG. 5, base station 102 includes: a storage unit 504 for storing previously transmitted TPC commands 505; a data processor 506 for executing software 508. Software 508 is configured such that, when executed by data processor 506, software 508 causes the base station 102 to function as described above. That is, for example, software 508 may cause the base station 102 to calculate an average TPC command for a set of previously transmitted TPC commands. As further shown, data processor 506 may be coupled to a receiving and transmission means 511 (e.g., transmit/receive buffers and/or transmitters/receivers or the like) that enables the base station 102 to communicate with mobile terminals 104.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A base station comprising:
   a processor for calculating a Transmit Power Control (TPC) command using TPC commands that were previously transmitted to a set of two or more mobile terminals; and
   a transmitter for transmitting the TPC command calculated by the processor to a mobile terminal for which the base station does not have an up-to-date measurement of the mobile terminal's signal quality.

2. The base station of claim 1, wherein the mobile terminal is configured to use the TPC command in setting the power at which the mobile terminal transmits uplink data to the base station.

3. The base station of claim 2, wherein the uplink data is an uplink control response.

4. The base station of claim 1, wherein the transmitter is configured to transmit the TPC command along with downlink data to the mobile terminal.

5. The base station of claim 1, further comprising a receiver for receiving a request from the mobile terminal, and wherein the transmitter is configured to transmit the TPC command to the mobile terminal in response to the receiver receiving the request.

6. The base station of claim 1, wherein the transmitter is configured to transmit the TPC command along with an uplink scheduling command to the mobile terminal.

7. The base station of claim 1, wherein the base station is configured to schedule the mobile terminal in the downlink, and to determine whether there is an up-to-date measurement of the mobile terminal's signal quality in response to scheduling the mobile terminal in the downlink.

8. The base station of claim 1, wherein the processor is configured to calculate the TPC command by determining the average of the TPC commands that were previously transmitted to the set of mobile terminals.

9. The base station of claim 1, wherein the processor is configured to calculate the TPC command by determining the xth percentile of the TPC commands that were previously transmitted to the set of mobile terminals.

10. The base station of claim 1, wherein the set of mobile terminals consists of all the active mobile terminals in communication with the base station.

11. The base station of claim 1, wherein the set of mobile terminals consists of a subset of all the active mobile terminals in communication with the base station.

12. The base station of claim 1, wherein the processor is configured to calculate the TPC command by determining the average of the TPC commands that were previously transmitted to the set of mobile terminals since the last time the base station measured the signal quality of the mobile terminal.

13. The base station of claim 1, wherein the processor is configured to measure the mobile terminal's signal quality.

14. The base station of claim 1, wherein the processor is configured to calculate a second TPC command based, at least in part, on the measured signal quality, and wherein the transmitter is configured for transmitting the second TPC command to the mobile terminal.

15. The base station of claim 1, wherein the set of mobile terminals consists of all of the mobile terminals for which the base station has an up-to- date signal quality measurement.

16. The base station of claim 1, wherein the set of mobile terminals consists of a subset of all of the mobile terminals for which the base station has an up-to-date signal quality measurement.

17. A communication system comprising:
   a base station; and
   a mobile terminal;
   wherein the base station is configured to:
      calculate a transmit power control (TPC) command using TPC commands that were previously transmitted to a set of two or more other mobile terminals; and
      transmit to the mobile terminal the calculated TPC command in response to an event, if the base station does not have an up-to-date measurement of the mobile terminal's signal quality, and
   further wherein the mobile terminal is configured to receive the TPC command from the base station and then transmit data to the base station using a power level based, at least in part, on the received TPC command.

18. The communication system of claim 17, wherein the data is an uplink control response.

19. The communication system of claim 17, wherein the event comprises the scheduling of a downlink transmission for the mobile terminal.

20. The communication system of claim 17, wherein the base station is configured to transmit the TPC command along with downlink data to the mobile terminal.

21. The communication system of claim 17, wherein the event comprises receiving a request from the mobile terminal.

22. The communication system of claim 21, wherein the base station is configured to transmit the TPC command along with an uplink scheduling command to the mobile terminal.

23. The communication system of claim 17, wherein the base station is configured to determine whether there is an up-to-date measurement of the mobile terminal's signal quality, in response to the base station scheduling the mobile terminal in the downlink.

24. The communication system of claim 17, wherein the base station is configured to calculate the TPC command by determining the average of the TPC commands that were previously transmitted to the set of other mobile terminals.

25. The communication system of claim 17, wherein the base station is configured to calculate the TPC command by determining the xth percentile of the TPC commands that were previously transmitted to the set of other mobile terminals.

26. The communication system of claim 17, wherein the set of other mobile terminals consists of all of the mobile terminals for which the base station has an up-to-date signal quality measurement.

27. The communication system of claim 17, wherein the set of other mobile terminals consists of a subset of all of the mobile terminals for which the base station has an up-to-date signal quality measurement.

28. The communication system of claim 17, wherein the base station is further configured to measure the mobile terminal's signal quality.

29. The communication system of claim 28, wherein the base station is further configured to:
    calculate a second TPC command based, at least in part, on the measured signal quality; and
    transmit the second TPC command to the mobile terminal.

30. A method for controlling the transmit power of a mobile terminal, said method comprising:
    (a) determining a transmit power control (TPC) command, wherein the TPC command is a function of TPC commands that were previously transmitted to a set of two or more other mobile terminals;
    (b) determining whether there is an up-to-date signal quality measurement for the mobile terminal; and
    (c) if there is not an up-to-date signal quality measurement for the mobile terminal, then transmitting to the mobile terminal the TPC command from step (a).

31. The method of claim 30, further comprising scheduling the mobile terminal in the downlink, wherein step (b) is performed in response to the scheduling of the mobile terminal in the downlink.

32. The method of claim 30, wherein the mobile terminal uses the TPC command in setting the power at which the mobile terminal transmits uplink data to the base station, wherein the uplink data is an uplink control response.

33. The method of claim 30, wherein the step of transmitting the TPC command to the mobile terminal comprises transmitting the TPC command along with downlink data to the mobile terminal.

34. The method of claim 30, further comprising receiving a request from the mobile terminal, wherein step (b) is performed in response to receiving the request.

35. The method of claim 34, wherein the step of transmitting the TPC command to the mobile terminal comprises transmitting to the mobile terminal the TPC command along with an uplink scheduling command.

36. The method of claim 30, wherein the step of calculating the TPC command comprises determining the average of the TPC commands that were previously transmitted to the set of other mobile terminals.

37. The method of claim 30, wherein the step of calculating the TPC command comprises determining the xth percentile of the TPC commands that were previously transmitted to the set of other mobile terminals.

38. The method of claim 30, wherein the set of other mobile terminals consists of all of the mobile terminals for which the base station has an up-to-date signal quality measurement.

39. The method of claim 30, wherein the set of other mobile terminals consists of a subset of all of the mobile terminals for which the base station has an up- to-date signal quality measurement.

40. The method of claim 30, wherein the TPC command is a power correction factor.

41. The method of claim 40, wherein the TPC command is a $\Delta_{PUCCH}$ value.

42. The method of claim 30, further comprising:
    for each mobile terminal included in the set of mobile terminals, determining an accumulated TPC command value;
    calculating a value based, at least in part, on the accumulated TPC command values, wherein step (a) comprises setting the TPC command to the calculated value or to a value included in a set of predetermined values that is closest to the calculated value.

43. The method of claim 42, wherein the step of determining an accumulated TPC command value for one of the mobile terminals included in the set of mobile terminals comprises summing all of the TPC commands sent to said one of the mobile terminals since the last time the base station measured the signal quality of the mobile terminal.

44. The method of claim 42, wherein the step of calculating a value based, at least in part, on the accumulated TPC command values comprises calculating the average or the xth percentile of the accumulated TPC command values.

* * * * *

UNITED STATES PATENT AND TRADEMARK OFFICE
CERTIFICATE OF CORRECTION

PATENT NO. : 8,437,704 B2
APPLICATION NO. : 12/863105
DATED : May 7, 2013
INVENTOR(S) : Burström et al.

It is certified that error appears in the above-identified patent and that said Letters Patent is hereby corrected as shown below:

Title Page, Item (12), under "United States Patent", in Column 1,
Line 1, delete "Burstrom et al." and insert -- Burström et al. --, therefor.

Title Page, Item (75), under "Inventors", in Column 1, Line 1,
delete "Per Burstrom," and insert -- Per Burström, --, therefor.

Title Page, Item (75), under "Inventors", in Column 1, Line 1,
delete "Lulea" and insert -- Luleå --, therefor.

Title Page, Item (75), under "Inventors", in Column 1, Lines 1-2,
delete "Anders Furuskar," and insert -- Anders Furuskär, --, therefor.

Title Page, Item (75), under "Inventors", in Column 1, Line 4,
delete "Walter Muller," and insert -- Walter Müller, --, therefor.

Title Page, Item (75), under "Inventors", in Column 1, Line 4,
delete "Upplands Vasby" and insert -- Upplands Väsby --, therefor.

Signed and Sealed this
Eighth Day of October, 2013

Teresa Stanek Rea
*Deputy Director of the United States Patent and Trademark Office*